US006715675B1

(12) United States Patent
Rosenfeld

(10) Patent No.: US 6,715,675 B1
(45) Date of Patent: Apr. 6, 2004

(54) ELECTRONIC SHELF LABEL SYSTEMS AND METHODS

(75) Inventor: Oren Rosenfeld, Mazkeret-Batya (IL)

(73) Assignee: Eldat Communication Ltd., Bnei-Brak (IL)

( * ) Notice: Subject to any disclaimer, the term of this patent is extended or adjusted under 35 U.S.C. 154(b) by 60 days.

(21) Appl. No.: 09/714,798

(22) Filed: Nov. 16, 2000

(51) Int. Cl.⁷ .............................................. G06K 15/00
(52) U.S. Cl. ........................... 235/383; 705/20; 705/22
(58) Field of Search ............................ 235/383; 705/20, 705/22

(56) References Cited

U.S. PATENT DOCUMENTS

| | | | | |
|---|---|---|---|---|
| 3,698,795 A | * | 10/1972 | Flint | 359/571 |
| 4,294,891 A | * | 10/1981 | Yao et al. | 429/2 |
| 4,704,003 A | * | 11/1987 | Komaki | 348/58 |
| 4,710,820 A | * | 12/1987 | Roberts | 348/781 |
| 5,151,684 A | * | 9/1992 | Johnsen | 340/568.1 |
| 5,243,504 A | * | 9/1993 | Sejzer | 362/154 |
| 5,374,815 A | * | 12/1994 | Waterhouse et al. | 235/383 |
| 5,448,226 A | * | 9/1995 | Failing et al. | 340/5.91 |
| 5,465,085 A | * | 11/1995 | Caldwell et al. | 340/5.91 |
| 5,467,474 A | * | 11/1995 | Ackerman et al. | 705/22 |
| 5,473,146 A | * | 12/1995 | Goodwin, III | 235/383 |

(List continued on next page.)

FOREIGN PATENT DOCUMENTS

| | | |
|---|---|---|
| AU | 9923674 | 10/1999 |
| DE | 19840248 | 3/2000 |
| DE | 19840251 | 3/2000 |
| EP | 0837439 | 4/1998 |
| EP | 0974918 | 1/2000 |
| FR | 2772529 | 6/1999 |
| FR | 2778775 | 11/1999 |
| GB | 2249854 | 5/1992 |
| JP | 2000152857 | 6/2000 |
| SE | 9103048 | 11/1994 |
| WO | WO 95/22798 | 8/1995 |
| WO | WO 96/32683 | 10/1996 |
| WO | WO 98/00819 | 1/1998 |
| WO | WO 98/32115 | 7/1998 |
| WO | WO 99/65288 | 12/1999 |

OTHER PUBLICATIONS

Barry, John R., *Wireless Infrared Communications*, Kluwer Academic Publishers, 1994, pp. 75–77.
"PSC Inc. Laser Bar Code Reader and Barcode Scanner Contact Page", p. 1, 2000, http://www.percon.com/html/psc_contactpsc.htm.
"PSC USA", p. 1, Nov. 2000, http://www.pscnet.com/html/usa.htm.
"PT2000 Portable Terminal", pp. 1–2, http://www.percon.com/html/pt2000.htm.
Sekine, K. et al., "Characteristics of Rewritable Media Utilizing Smectic A PDLC Films", Information Imaging Laboratory, Central Research Institute, IDS 99, Japan, pp. 315–318.
Buckle, H. (editor), "Sending Out Clear Signals", *European Supermarkets*, Mar./Apr. 1999, pp. 26–32.
*Research Disclosure* 34494, "Electronic Price Tag", Anonymous, Dec. 1992, p. 969.

*Primary Examiner*—Karl D. Frech
*Assistant Examiner*—Kumiko C. Koyama
(74) *Attorney, Agent, or Firm*—Darby & Darby

(57) ABSTRACT

This invention discloses an electronic shelf label including an LCD display, a housing including a protective at least partially transparent cover layer disposed over the LCD display and in spaced relationship thereto, and an at least partially transparent intermediate layer formed over the LCD display and substantially filling a space between the LCD display and the protective at least partially transparent cover layer.

65 Claims, 14 Drawing Sheets

U.S. PATENT DOCUMENTS

| | | | |
|---|---|---|---|
| 5,539,393 A | | 7/1996 | Barfod |
| 5,553,412 A | | 9/1996 | Briechle et al. |
| 5,572,653 A | | 11/1996 | DeTemple et al. |
| 5,575,100 A | * | 11/1996 | Marvin et al. ............ 40/642.02 |
| 5,635,915 A | * | 6/1997 | Gray ...................... 340/825.57 |
| 5,753,900 A | | 5/1998 | Goodwin, III et al. |
| 5,828,427 A | * | 10/1998 | Faris ............................. 349/5 |
| 5,847,378 A | * | 12/1998 | Goodwin, III .............. 235/383 |
| 5,880,449 A | | 3/1999 | Teicher et al. |
| 5,910,653 A | * | 6/1999 | Campo ................. 250/214 AL |
| 5,933,813 A | | 8/1999 | Teicher et al. |
| 5,975,416 A | | 11/1999 | Chow et al. |
| 6,011,487 A | * | 1/2000 | Plocher ................. 340/825.49 |
| 6,031,585 A | | 2/2000 | Stevens, III |
| 6,069,596 A | * | 5/2000 | Marvin et al. ................ 345/52 |
| 6,081,558 A | | 6/2000 | North |
| 6,081,612 A | | 6/2000 | Gutkowicz-Krusin et al. |
| 6,085,576 A | | 7/2000 | Sunshine et al. |
| 6,091,884 A | | 7/2000 | Yuen et al. |
| 6,094,007 A | * | 7/2000 | Faul et al. ................... 313/512 |
| 6,099,522 A | | 8/2000 | Knopp et al. |
| 6,104,939 A | | 8/2000 | Groner et al. |
| 6,105,004 A | | 8/2000 | Halperin et al. |
| 6,119,990 A | * | 9/2000 | Kump et al. ........... 248/220.22 |
| 6,211,934 B1 | * | 4/2001 | Habing et al. .............. 349/105 |
| 6,238,813 B1 | * | 5/2001 | Maile et al. .................... 429/9 |
| 6,259,971 B1 | * | 7/2001 | Mitchell et al. ............ 700/286 |
| 6,269,342 B1 | * | 7/2001 | Brick et al. .................... 705/20 |
| 6,326,097 B1 | * | 12/2001 | Hockaday .................... 429/34 |

\* cited by examiner

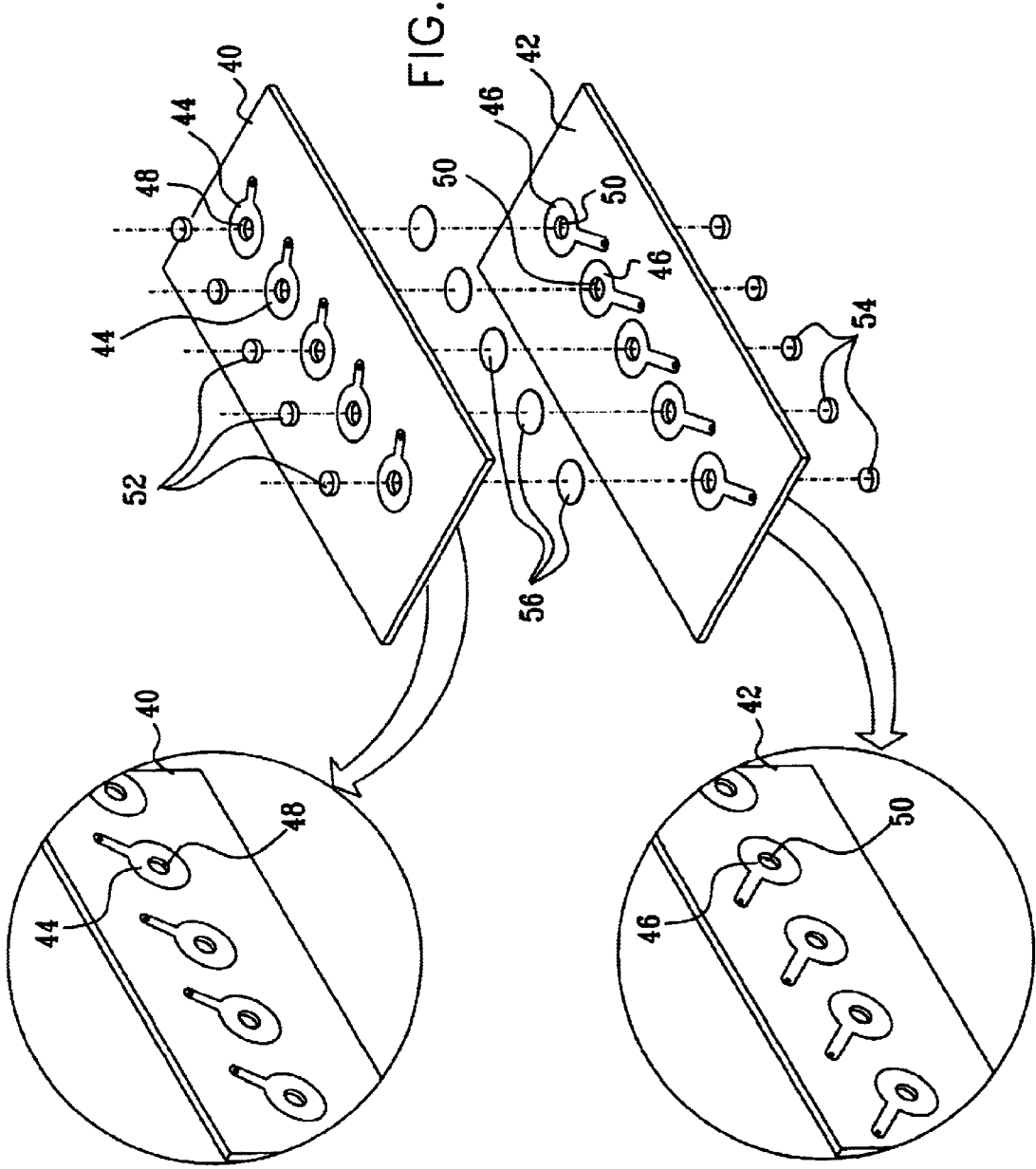

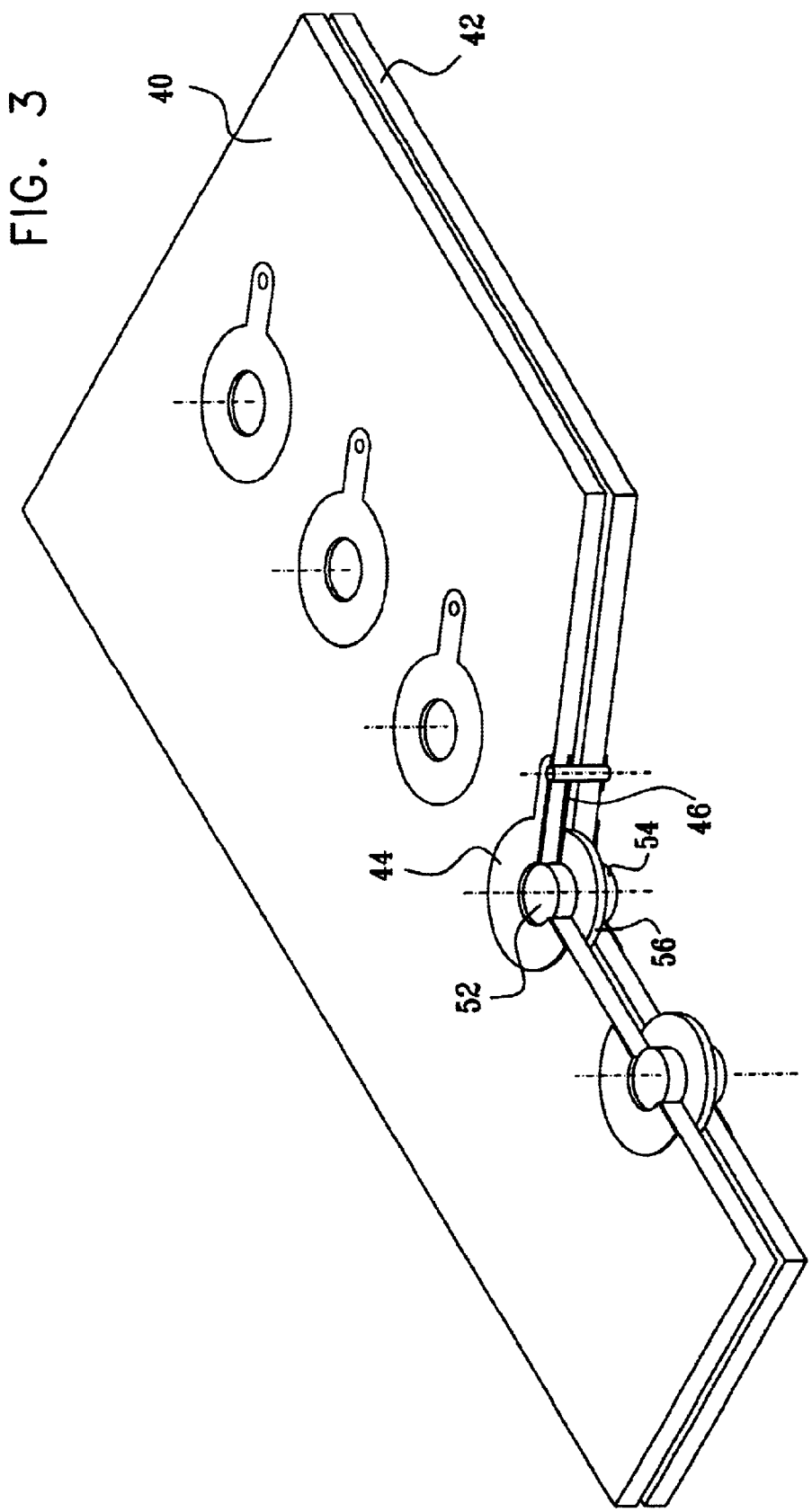

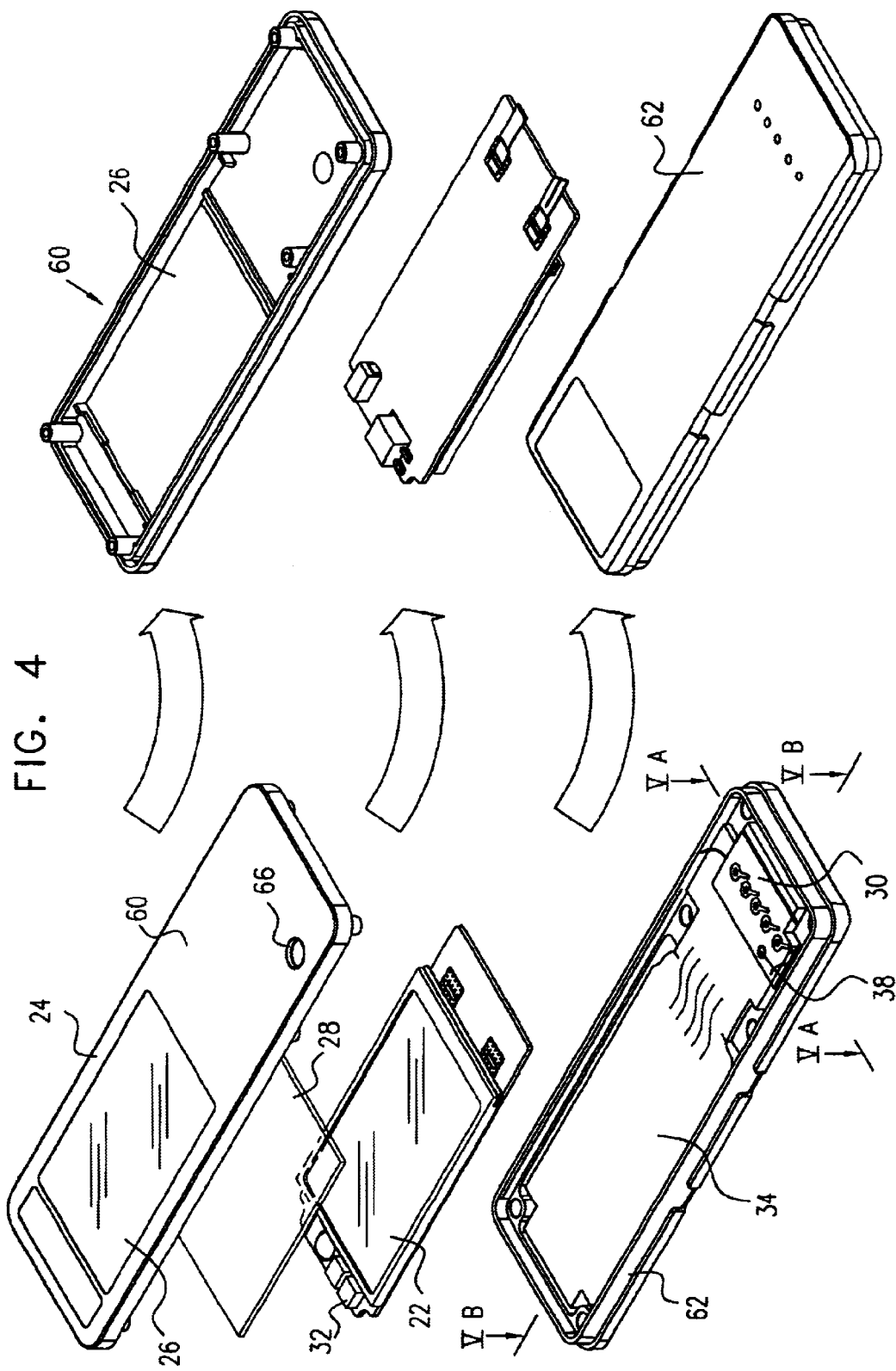

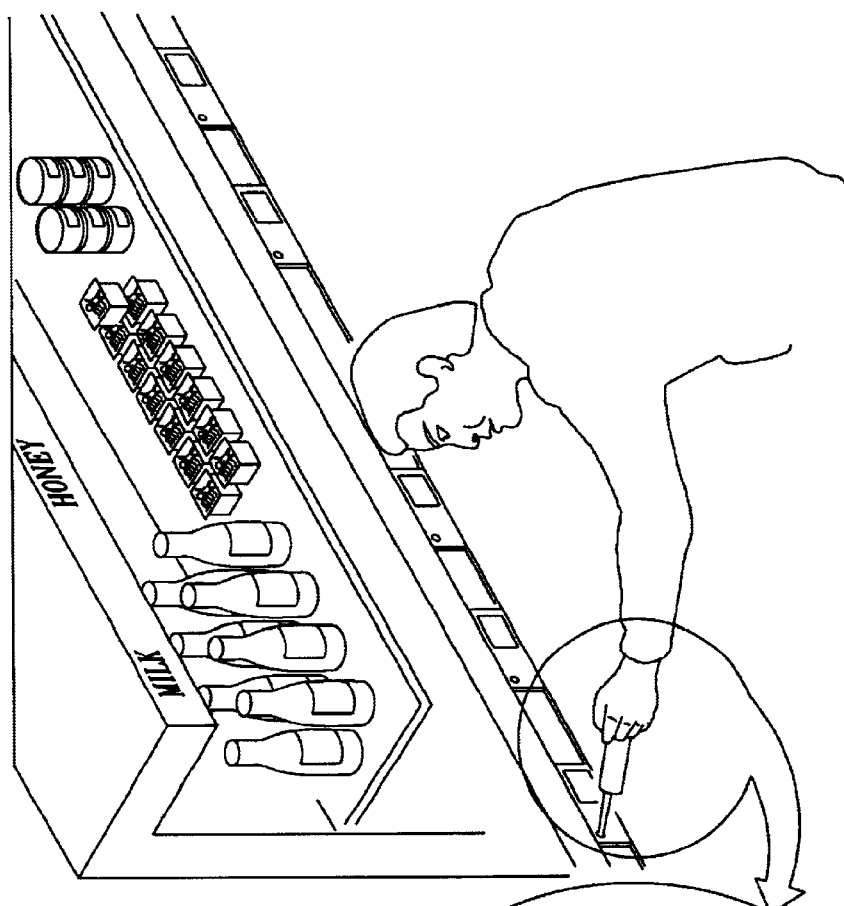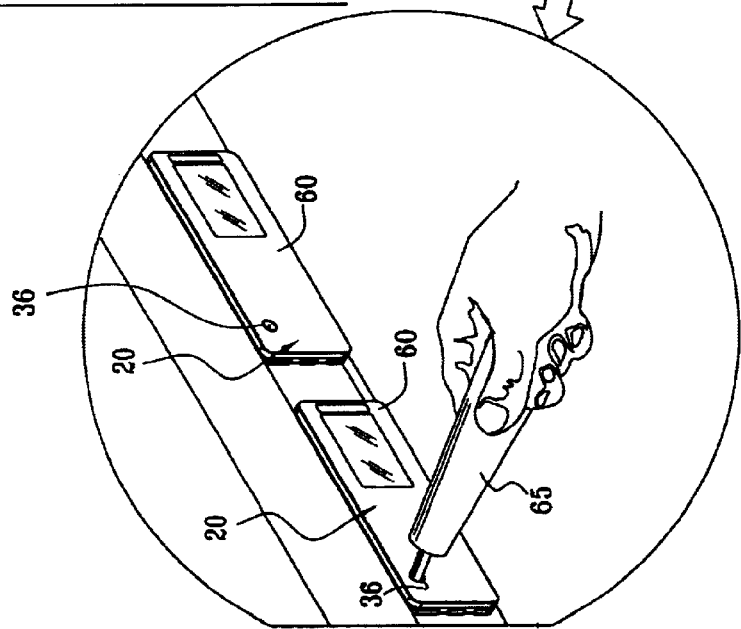
FIG. 7

ELECTRONIC SHELF LABEL SYSTEMS AND METHODS

FIELD OF THE INVENTION

The present invention relates to electronic shelf labels and to electronic shelf label systems generally.

BACKGROUND OF THE INVENTION

There are known in the prior art a variety of different types of electronic shelf labels and electronic shelf label systems. The following U.S. Patents and other publications are believed to represent the state of the art:
U.S. Pat. Nos. 5,539,393; 5,553,412; 5,572,653; 5,753,900; 5,880,449; 5,933,813; 5,975,416; 6,031,585; 6,105,004.
JP 2000152857; DE 19840248; DE 19840251; EP 974918A2; AU 9923674; FR 2778775; FR 2772529; SE 9103048; RD 344094; GB 2249854.
WO 95/22798; WO 98/00819; WO 98/32115; WO 99/65288.

The disclosure in Section 3.7.4. of "Wireless Infrared Communications", by John R. Barry, Kluwer Academic Publishers, 1994, pp. 75–77 is believed to be relevant to part of the subject matter of the present invention.

The present applicant/assignee is the proprietor of the following published patents and patent applications: U.S. Pat. Nos. 5,880,449; 5,933,813; 6,105,004.
U.S. patent application No. U.S. Ser. No. 09/147,422.
WO 98/00819; WO 96/32683;

SUMMARY OF THE INVENTION

The present invention seeks to provide improved electronic shelf labels and electronic shelf labels systems.

There is thus provided in accordance with a preferred embodiment of the present invention an electronic shelf label including an LCD display, a housing including a protective at least partially transparent cover layer disposed over the LCD display and in spaced relationship thereto, and an at least partially transparent intermediate layer formed over the LCD go display and substantially filling a space between the LCD display and the protective at least partially transparent cover layer.

Further in accordance with a preferred embodiment of the present invention the at least partially transparent intermediate layer has an index of refraction which is selected so as to minimize reflection at interfaces between the at least partially transparent intermediate layer and both of the LCD display and the protective at least partially transparent cover layer.

Still further in accordance with a preferred embodiment of the present invention the at least partially transparent intermediate layer is located with respect to the LCD display and to the protective at least partially transparent cover layer so as to substantially eliminate air gaps therebetween.

Additionally in accordance with a preferred embodiment of the present invention, the electronic shelf label also includes at least one fuel cell powering the LCD display.

Preferably the fuel cell includes at least first and second printed circuit boards, each having electrical contacts formed thereon, the electrical contacts on the first and second printed circuit boards each being in at least partial registration with each other, the printed circuit boards each being formed with a plurality of apertures generally surrounded by the electrical contacts, a plurality of electrodes, each electrode being located in one of the apertures, and a membrane disposed between the first and second printed circuit boards, the membrane providing electrical insulation between the electrical contacts on the first and second printed circuit boards and permitting ionic transfer thereacross between the electrodes, and the electrodes located in apertures on the first printed circuit board being exposed to a fuel, and the electrodes located in apertures on the second printed circuit board being exposed to air.

Moreover in accordance with a preferred embodiment of the present invention the fuel cell powering the LCD display includes a fuel tank, filling generally the volume of the housing not occupied by the display and the communicator.

Still further in accordance with a preferred embodiment of the present invention the index of refraction of the intermediate layer is identical to the index of refraction of at least one of the LCD display and the protective at least partially transparent cover layer.

Preferably the index of refraction varies from one surface of the intermediate layer to an opposite surface thereof.

There is also provided in accordance with yet another preferred embodiment of the present invention an electronic shelf label system including a multiplicity of electronic shelf labels, each including an IR transmitter for transmitting information relating to the electronic shelf label, at least one receiver receiving IR transmissions from the multiplicity of electronic shelf labels, the at least one receiver including an IR sensor, a non-IR visible light sensor, and circuitry for employing an output of the non-IR visible light sensor for reducing interference in a signal band sensed by the IR sensor.

Further in accordance with a preferred embodiment of the present invention there is provided an electronic shelf label system and wherein each of the multiplicity of electronic shelf labels includes an LCD display, a housing including a protective at least partially transparent cover layer disposed over the LCD display and in spaced relationship thereto, and an at least partially transparent intermediate layer formed over the LCD display and substantially filling a space between the LCD display and the protective at least partially transparent cover layer.

Preferably the at least partially transparent intermediate layer has an index of refraction which is selected so as to minimize reflection at interfaces between the at least partially transparent intermediate layer and both of the LCD display and the protective at least partially transparent cover layer.

Still further in accordance with a preferred embodiment of the present invention the at least partially transparent intermediate layer is located with respect to the LCD display and to the protective at least partially transparent cover layer so as to substantially eliminate air gaps therebetween.

Moreover in accordance with a preferred embodiment of the present invention each electronic shelf label also includes at least one fuel cell powering the LCD display.

Preferably the fuel cell includes at least first and second printed circuit boards, each having electrical contacts printed thereon, the electrical contacts on the first and second printed circuit boards being in at least partial registration with each other, the printed circuit boards each being formed with a plurality of apertures generally surrounded by the electrical contacts, a plurality of electrodes, each electrode being located in one of the apertures, and a membrane disposed between the first and second printed circuit boards, the membrane providing electrical insulation between the electrical contacts on the first and second printed circuit boards and permitting ionic transfer thereacross between the electrodes, and the electrodes being located in apertures on the first printed circuit board being exposed to a fuel, and the electrodes located in apertures on the second printed circuit board being exposed to air.

There is further provided in accordance with yet another preferred embodiment of the present invention an electronic shelf label which includes a housing, an electrically driven display mounted in the housing, at least one electrically powered illuminator, at least one fuel cell powering the electrically driven display and the at least one electrically powered illuminator, and a data communicator providing display data to the electrically driven display from an external data source.

There is also provided in accordance with a preferred embodiment an electronic shelf label including a housing, an electrically driven display mounted in the housing, at least one fuel cell powering the electrically driven display, the at least one fuel cell including a fuel tank, filling generally the volume of the housing not occupied by the display and the communicator, and a data communicator providing display data to the electrically driven display from an external data source.

Further in accordance with a preferred embodiment of the present invention there is provided an electronic shelf label which also includes at least one electrically powered illuminator, and wherein the at least one electrically powered illuminator and the electrically driven display have an average lifetime without requiring repowering of at least six months.

Still further in accordance with a preferred embodiment of the present invention the at least one fuel cell has an average mean power output of less than approximately 50 microwatts.

Additionally in accordance with a preferred embodiment of the present invention the at least one fuel cell has an average peak power output of less than approximately 3 milliwatt.

Moreover in accordance with a preferred embodiment of the present invention the fuel tank is fluid refuelable without requiring dismounting of the housing from a mounting location.

Furthermore in accordance with a preferred embodiment of the present invention the at least one fuel cell is replaceable without requiring dismounting of the housing from a mounting location.

There is also provided in accordance with yet a further embodiment of the present invention an electronic shelf label including a housing, an electrically driven display mounted in the housing, at least one electrically powered illuminator, at least one replaceable energy source powering the electrically driven display and the at least one electrically powered illuminator, and a data communicator providing display data to the electrically driven display from an external data source, the at least one replaceable energy source being replaceable without requiring dismounting of the housing from a mounting location.

Further in accordance with a preferred embodiment of the present invention the electronic shelf label also includes an at least partially transparent intermediate layer formed over the display and substantially filling a space between the display and the housing.

Still further in accordance with a preferred embodiment of the present invention the at least partially transparent intermediate layer has an index of refraction which is selected so as to minimize reflection at interfaces between the at least partially transparent intermediate layer and both of the LCD display and the housing.

Additionally in accordance with a preferred embodiment of the present invention at least partially transparent intermediate layer is located with respect to the display and the housing so as to substantially eliminate air gaps therebetween.

There is also provided in accordance with a preferred embodiment of the present invention a fuel cell including at least first and second printed circuit boards, each having electrical contacts printed thereon, the electrical contacts on the printed circuit boards being in at least partial registration with each other, the printed circuit boards each being formed with a plurality of apertures generally surrounded by the electrical contacts, a plurality of electrodes, each electrode being located in one of the apertures, and a membrane disposed between the first and second printed circuit boards, the membrane providing electrical insulation between the electrical contacts on the first and second printed circuit boards and permitting ionic transfer thereacross between the electrodes, the electrodes being located in apertures on the first printed circuit board being exposed to a fuel, and the electrodes located in apertures on the second printed circuit board being exposed to air.

There is also provided in accordance with yet another preferred embodiment of the present invention an electronic shelf label including a flexible electrically driven display mounted in the housing, at least one flexible power supply powering the electrically driven display, and a data communicator providing display data to said electrically driven display from an external data source.

There is further provided in accordance with a further embodiment of the present invention an electronic shelf label system including a multiplicity of flexible electronic shelf labels, each including an IR transmitter for transmitting information relating to the electronic shelf label, and at least one receiver receiving IR transmissions from the multiplicity of flexible electronic shelf labels.

Further in accordance with a preferred embodiment of the present invention the at least one receiver includes an IR sensor, a non-IR visible light sensor, and circuitry for employing an output of the non-IR visible light sensor for reducing interference in a signal band sensed by the IR sensor.

Still further in accordance with a preferred embodiment of the present invention each of the multiplicity of electronic shelf labels comprises a flexible LCD display.

Additionally in accordance with a preferred embodiment of the present invention each electronic shelf label also includes at least one fuel cell powering the LCD display.

There is also provided in accordance with yet another preferred embodiment of the present invention an electronic shelf label system including a multiplicity of electronic shelf labels, each including an electronic display for displaying product information, and a product information entry device which is operative to directly write product information to the electronic display when in propinquity thereto.

There is also provided in accordance with yet another preferred embodiment of the present invention an electronic shelf label system including a multiplicity of electronic shelf labels, each including an IR receiver for receiving information relating to the electronic shelf label, and an electronic display for displaying product information based on the information received by the IR receiver, and at least one transmitter transmitting IR transmissions containing the information to the multiplicity of electronic shelf labels, the at least one transmitter being characterized in that it transmits information including both price and product description.

Further in accordance with a preferred embodiment of the present invention the electronic display displays both the price and the product description.

Still further in accordance with a preferred embodiment of the present invention the receiver receives the information including both price and product description.

Additionally in accordance with a preferred embodiment of the present invention the electronic display includes a unitary LCD display.

Moreover in accordance with a preferred embodiment of the present invention the receiver receives the price information and the product information is supplied to the electronic display other than via the receiver.

Furthermore in accordance with a preferred embodiment of the present invention the electronic display includes at least two separate LCD displays, at least one of which is operative to display price information received via the receiver and at least one of which is operative to display product information received other than via the receiver.

Still further in accordance with a preferred embodiment of the present invention the electronic shelf label system also includes a portable product information entry device which is operative to supply product information to the electronic display when in propinquity thereto.

Preferably the portable product information entry device is operative to receive a transmission from the transmitter including the product information and to provide the product information to the electronic display when in propinquity thereto.

Additionally in accordance with a preferred embodiment of the present invention the electronic shelf labels are flexible.

Moreover in accordance with a preferred embodiment of the present invention the portable product information entry device is operative to directly write product information onto the electronic display.

There is also provided in accordance with yet another preferred embodiment of the present invention a method of repowering an electronic shelf label including the following a housing, an electrically driven display mounted in the housing, at least one electrically powered illuminator, at least one replaceable energy source powering the electrically driven display and the at least one electrically powered illuminator, and a data communicator providing display data to the electrically driven display from an external data source, the method including the following step replacing the at least one replaceable energy course without requiring dismounting of the housing from a mounting location.

There is thus provided in accordance with yet another preferred embodiment of the present invention an electronic shelf label system including a multiplicity of electronic shelf labels, each electronic shelf label includes an RF receiver for receiving information relating to the electronic shelf label, and an electronic display for displaying product information based on the information received by the RF receiver, and at least one transmitter transmitting RF transmissions containing the information to the multiplicity of electronic shelf labels, the at least one transmitter being characterized in that it transmits information including both price and product description.

Further in accordance with a preferred embodiment of the present invention the electronic display displays both the price and the product description.

Still further in accordance with a preferred embodiment of the present invention the receiver receives the information including both price and product description.

Additionally in accordance with a preferred embodiment of the present invention the electronic display comprises a unitary LCD display.

Moreover in accordance with a preferred embodiment of the present invention the receiver receives the price information and wherein the product information is supplied to the electronic display other than via the receiver.

Furthermore in accordance with a preferred embodiment of the present invention the electronic display includes at least two separate LCD displays, at least one of which is operative to display price information received via the receiver and at least one of which is operative to display product information received other than via the receiver.

Additionally in accordance with a preferred embodiment of the present invention the electronic shelf label system also includes a portable product information entry device which is operative to supply product information to the electronic display when in propinquity thereto.

Preferably the portable product information entry device is operative to receive a transmission from the transmitter including the product information and to provide the product information to the electronic display when in propinquity thereto.

Furthermore in accordance with a preferred embodiment set of the present invention the electronic shelf labels are flexible.

Still further in accordance with a preferred embodiment of the present invention the portable product information entry device is operative to directly write product information onto the electronic display.

BRIEF DESCRIPTION OF THE DRAWINGS

The present invention will be understood and appreciated more fully from the following detailed description in which:

FIG. 2 is a simplified exploded view pictorial illustration of a fuel cell constructed and operative in accordance with a preferred embodiment of the present invention;

FIG. 3 is a simplified partially cut-away illustration of the fuel cell of FIG. 2;

FIG. 4 is a simplified exploded view pictorial illustration of an electronic shelf label constructed and operative in accordance with a preferred embodiment of the present invention and including a fuel cell of the type illustrated in FIGS. 2 & 3;

FIG. 7 is a simplified pictorial illustration of refueling the electronic shelf labels in accordance with one embodiment of the present invention;

DETAILED DESCRIPTION OF PREFERRED EMBODIMENTS

Figure 1:
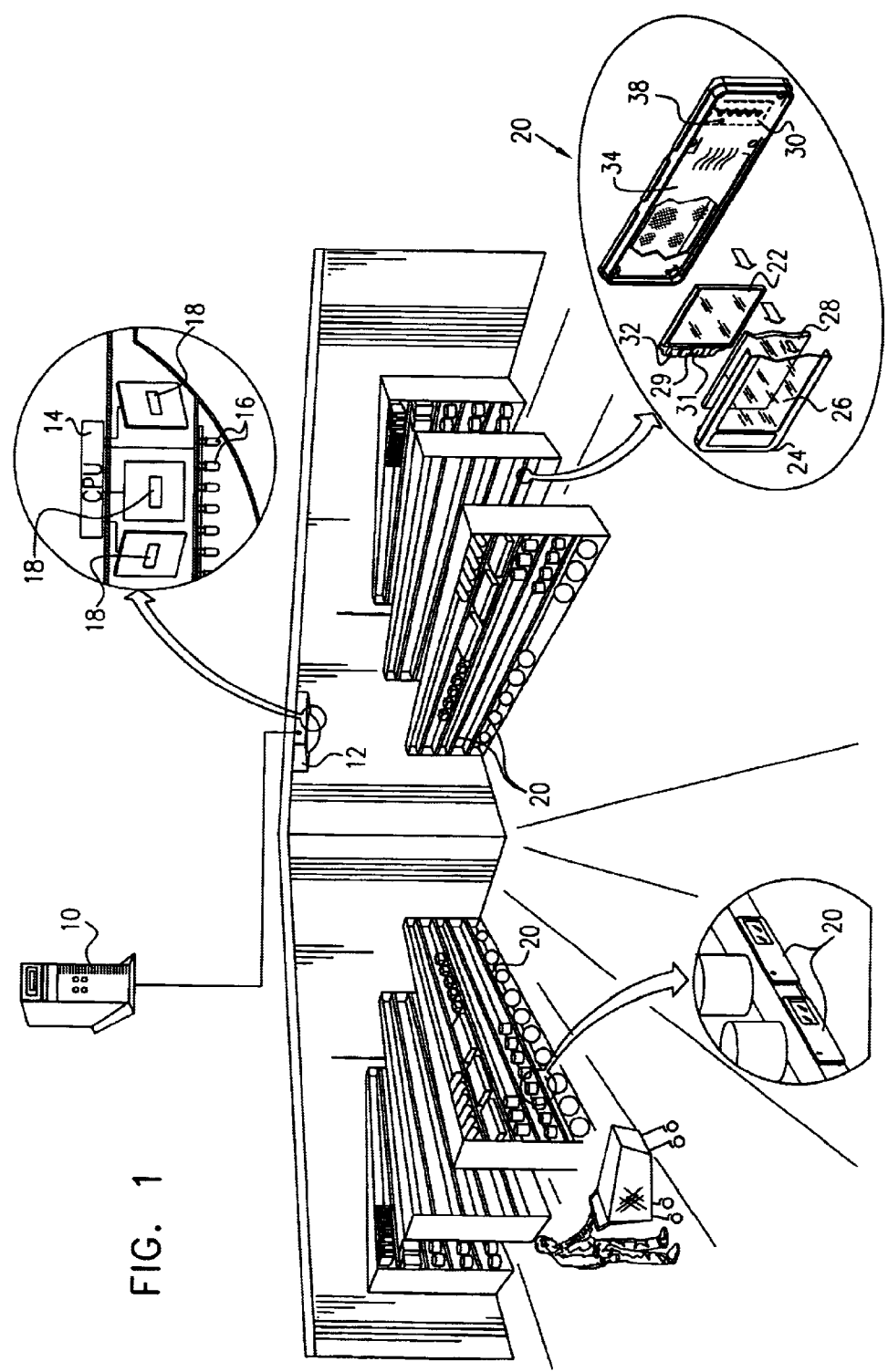
FIG. 1 is a simplified pictorial view illustration of an electronic shelf label system constructed and operative in accordance with a preferred embodiment of the present invention.

Reference is now made to FIG. 1, which is a simplified pictorial view illustration of an electronic shelf label system constructed and operative in accordance with a preferred embodiment of the present invention. The system of FIG. 1 typically includes one or more servers 10 which may be located on the premises of a shop, such as a supermarket or alternatively may be located remotely therefrom and connected thereto by means of any suitable communication subsystem.

Located within the premises of the shop are one or more transceiver assemblies 12, which typically include a CPU 14, which is typically coupled to a plurality of LEDs 16 for optical information transmittal and to a plurality of optical sensors 18 for optical information receipt. Normally, the information transmittal and receipt is carried out using an infrared communication methodology.

A multiplicity of electronic shelf labels 20 are disposed throughout the shop, typically on shelf edges. In accordance with a preferred embodiment of the present invention, the electronic shelf labels 20 are each in wireless communication with one or more transceiver assemblies 12 for receiving and confirming information updates for display by the electronic shelf labels 20.

In accordance with a preferred embodiment of the present invention, each electronic shelf label 20 includes an LCD display 22 disposed in a housing 24 including a protective, at least partially transparent, cover layer 26 disposed over the LCD display 22 and in spaced relationship thereto. An at least partially transparent intermediate layer 28 is preferably formed over the LCD display 22 and substantially fills the space between the LCD display 22 and the protective at least partially transparent cover layer 26.

The electronic shelf label 20 also comprises an IR emitter 29, such as a LED, for data transmission from the electronic shelf label 20 to an optical sensor 18 which is located in the transceiver 12. Additionally, the electronic shelf label 20 includes a photodiode 31 for receiving data transmissions from the LEDs 16, located in the transceiver 12.

Preferably, the at least partially transparent intermediate layer 28 has an index of refraction which is selected so as to minimize reflection at interfaces between the at least partially transparent intermediate layer 28 and both LCD display 22 and the protective at least partially transparent cover layer 26.

In accordance with a preferred embodiment of the invention, the at least partially transparent intermediate layer 28 is located with respect to LCD display 22 and to the protective at least partially transparent cover layer 26 so as to substantially eliminate air gaps therebetween.

As seen in FIG. 1, and described hereinbelow in greater detail, the electronic shelf label 20 preferably includes at least one fuel cell 30 powering the LCD display 22 and preferably other elements of the electronic shelf label.

Additionally, as seen in FIG. 1, the electronic shelf label 20 preferably includes at least one electrically powered illuminator, which is powered by the fuel cell 30. The illuminator may be a flashing LED 32. Alternatively or additionally, the illuminator may include a backlight (not shown) for LCD display 22. The backlight may include an electroluminescent element, an LED or any other suitable illumination element. It is also appreciated that the LCD display 22 may be replaced by any other suitable type of electrically powered display.

The fuel cell 30 preferably has an average mean power output of less than approximately 50 microwatts and an average peak power output of less than approximately 3 milliwatt. The fuel cell 30 is in fluid communication with a fuel tank 34. Fuel tank 34 preferably is fluid refuelable without requiring dismounting of the housing 24 from its mounting location. In accordance with one embodiment of the present invention, the at least one fuel cell is replaceable without requiring dismounting of the housing from its mounting location.

Preferably, the fuel tank 34 has sufficient energy storage capacity such that the electrically powered illuminator and the electrically driven display have an average lifetime without requiring repowering of at least six months.

Reference is now made to FIG. 2, which is a simplified exploded view pictorial illustration of a fuel cell, such as fuel cell 30 (FIG. 1), constructed and operative in accordance with a preferred embodiment of the present invention and to FIG. 3, which is a simplified partially cut-away illustration of the fuel cell of FIG. 2.

As seen in FIGS. 2 & 3, the fuel cell typically includes first and second printed circuit boards 40 and 42, each having plated-through electrical contacts formed thereon. The electrical contacts on circuit boards 40 and 42 are respectively designated by reference numerals 44 and 46. The electrical contacts 44 and 46 on respective first and second printed circuit boards 40 and 42 are preferably in partial registration with each other about respective apertures 48 and 50.

A plurality of electrodes 52 are located in respective apertures 48 and a plurality of electrodes 54 are located in respective apertures 50.

A membrane 56 is disposed between the first and second printed circuit boards 40 and 42, providing electrical insulation between the electrical contacts 44 and 46 on respective first and second printed circuit boards 40 and 42 and permitting ionic transfer thereacross between respective electrodes 52 and 54.

Electrodes 52 located in apertures 48 on the first printed circuit board 40 are exposed to a fuel, such as any suitable hydrocarbon fuel, and the electrodes 54 located in apertures 50 on the second printed circuit board 42 are exposed to air.

Figure 5A:
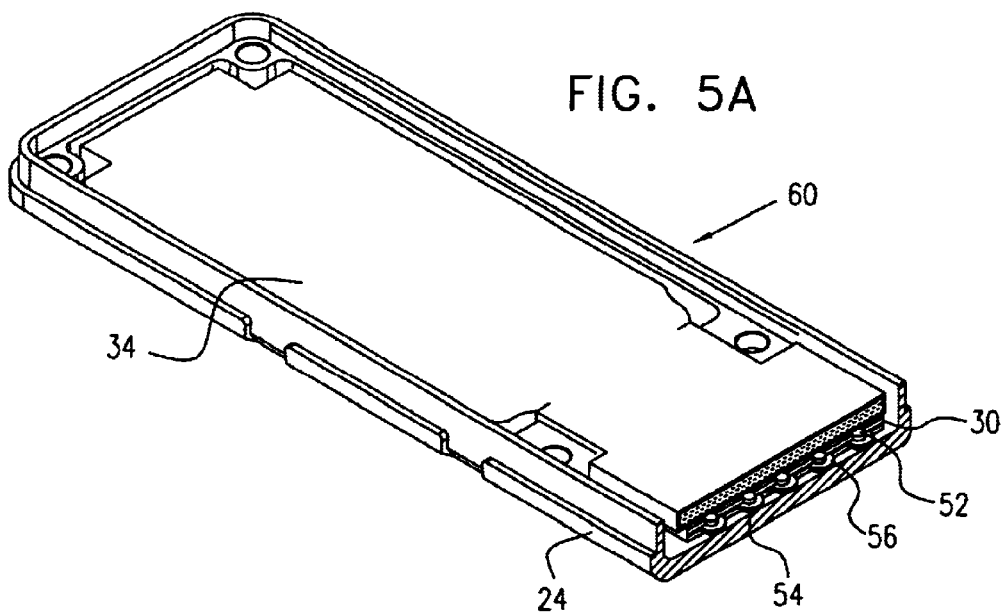
FIGS. 5A & 5B are each a partially sectional, partially pictorial illustration of a fuel cell of the type shown in FIGS. 2 & 3 coupled with a fuel tank in an arrangement such as that employed in the embodiment of FIG. 4.
Figure 5B:
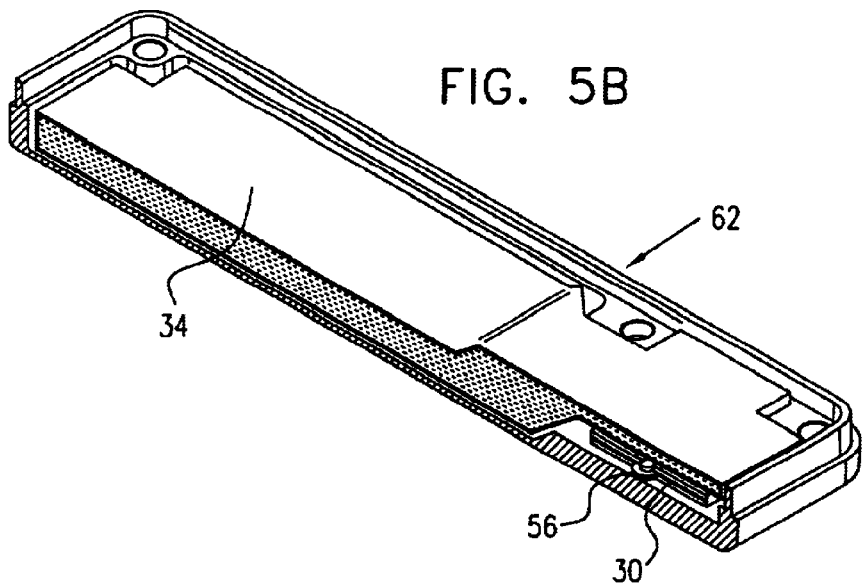
Figure 6:
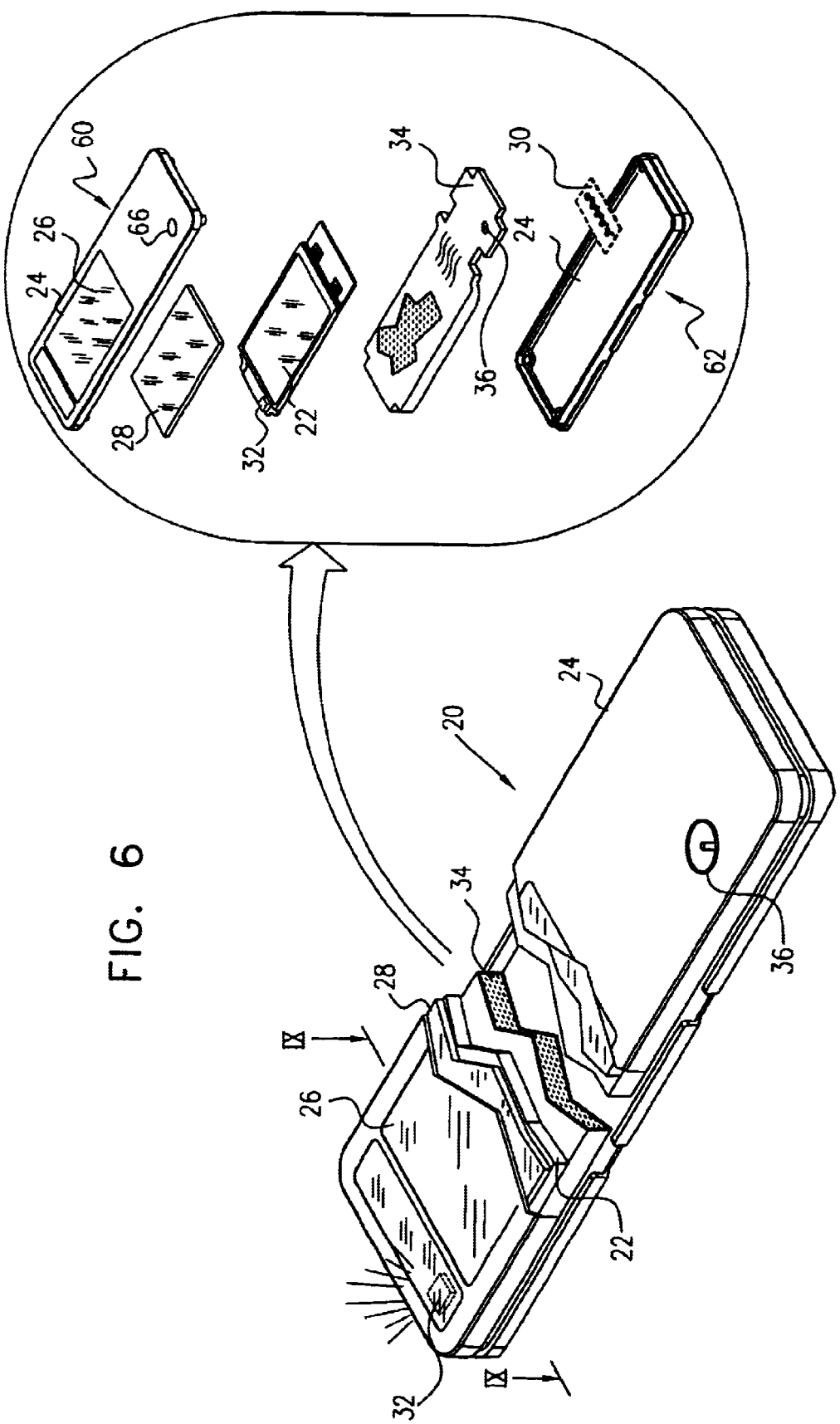
FIG. 6 is a simplified pictorial illustration of an electronic shelf label constructed and operative in accordance with preferred embodiment of the present invention.

Reference is now made to FIG. 4, which is a simplified exploded view pictorial illustration of an electronic shelf label, such as electronic shelf label 20 (FIG. 1), constructed and operative in accordance with a preferred embodiment of the present invention and including a fuel cell of the type illustrated in FIGS. 2 & 3 and to FIGS. 5A & 5B are each a partially sectional, partially pictorial illustration of a fuel cell of the type shown in FIGS. 2 & 3 coupled with a fuel tank in an arrangement such as that employed in the embodiment of FIG. 5B. It is noted that FIG. 5A is cut along section line VA—VA shown in FIG. 4, while FIG. 5B is cut along section line VB—VB shown in FIG. 4. Reference is also made to FIG. 6.

As seen in FIGS. 4, 5A, 5B and FIG. 6 and as described briefly above with reference to FIG. 1, the electronic shelf label 20 preferably comprises an LCD display 22, or any other suitable electrically driven display. The LCD display may be a conventional LCD display, preferably employed HTN technology, which is available from multiple vendors, such as Display Tech of Hong Kong and Yeboo of China.

The LCD display 22 is located in housing 24, typically including two parts which are typically snap-fit or press-fit together. FIGS. 4, 5A & 5B illustrate respective front and rear housing portions 60 and 62. The front housing portion 60 preferably includes a protective, at least partially transparent, cover layer 26, which is disposed over the LCD display 22 and in spaced relationship thereto. An at least partially transparent intermediate layer 28, which is not seen in FIGS. 5A and 5B, is preferably formed over the LCD display 22 and substantially fills the space between the LCD display 22 and the protective at least partially transparent cover layer 26.

Preferably, the at least partially transparent intermediate layer 28 has an index of refraction which is selected so as to minimize reflection at interfaces between the at least partially transparent intermediate layer 28 and both LCD display 22 and the protective at least partially transparent cover layer 26.

In accordance with a preferred embodiment of the invention, the at least partially transparent intermediate layer 28 is located with respect to LCD display 22 and to the protective at least partially transparent cover layer 26 so as to substantially eliminate air gaps therebetween.

An additional possible advantage of the provision of at least partially transparent intermediate layer 28 is the substantial elimination of the appearance of Newton rings or other types of Moire-type interference rings due to propinquity of the LCD display 22 and the cover layer 26.

As noted above with reference to FIG. 1, the electronic shelf label 20 preferably includes at least one fuel cell 30 powering the LCD display 22 and preferably other elements of the electronic shelf label. The fuel cell 30 is preferably constructed and operative as described hereinabove with reference to FIGS. 2 and 3 and is preferably associated with fuel tank 34, which preferably fills most of the volume of the housing 24 which is not taken up by the remaining elements of the electronic shelf label, as seen clearly in FIG. 5B. Fuel tank 34 may be refueled via a fueling port 36 which communicates with the fuel tank 34 via a one-way valve 38.

Additionally, as also seen in FIG. 1, the electronic shelf label 20 preferably includes at least one electrically powered illuminator, which is powered by the fuel cell 30. In the illustrated embodiment, the illuminator is a flashing LED 32, which is mounted on the LCD display 22.

Referring additionally to FIG. 7, it is seen that the electronic shelf labels 20 constructed and operative in accordance with the illustrated embodiment of the present invention may be refueled by hand, using a refueling tool 65, via a refueling port 36 formed in the front housing portion 60 and communicating with fuel tank 34 (as shown in FIG. 4). It is appreciated that such refueling may readily be accomplished without requiring removal of the electronic shelf label 20 from its mounting.

Figure 8:
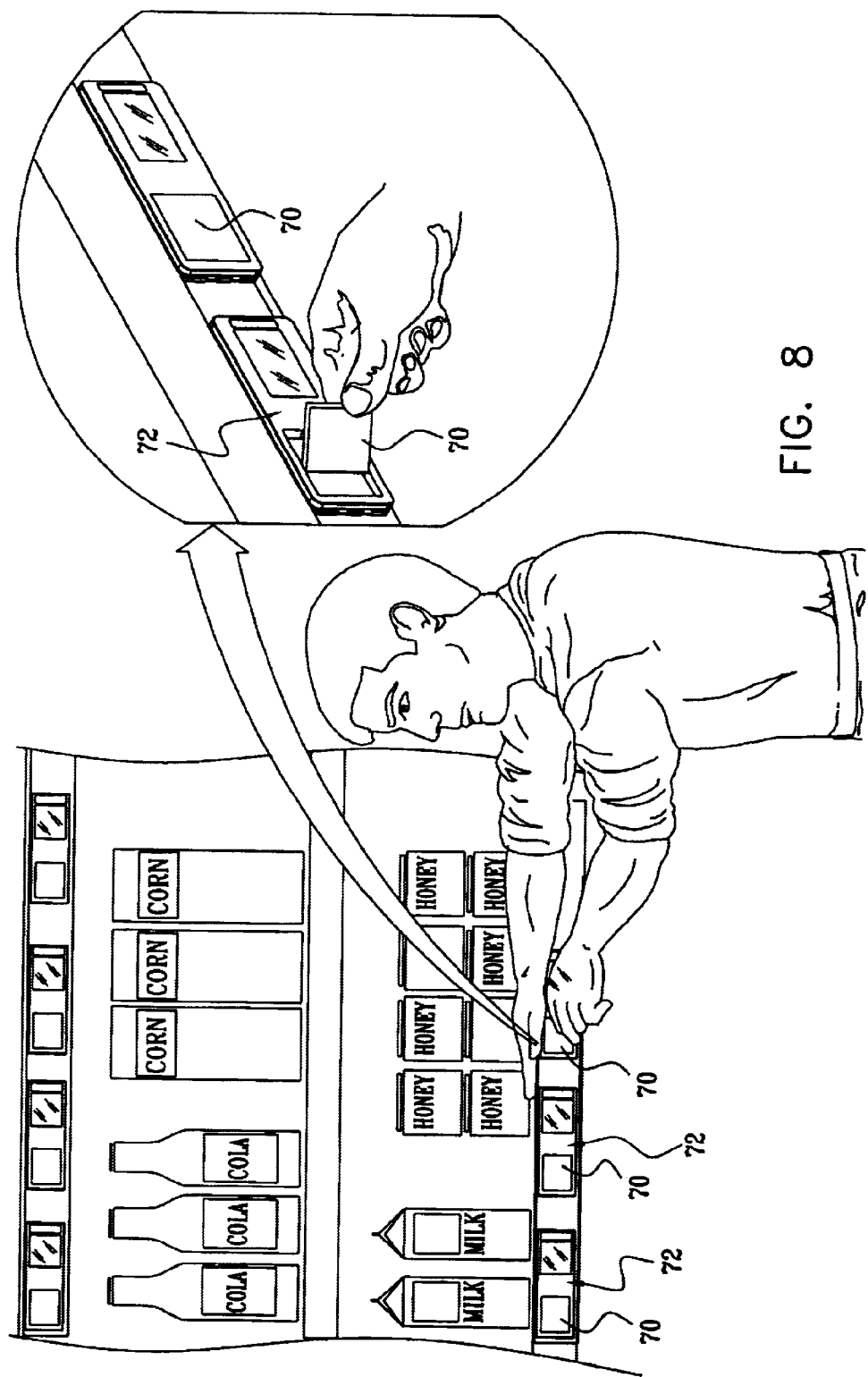
FIG. 8 is a simplified pictorial illustration of replacing an energy source in the electronic shelf labels in accordance with one embodiment of the present invention.

Reference is now made to FIG. 8, which is a simplified pictorial illustration of replacing an energy source in the electronic shelf labels in accordance with one embodiment of the present invention. As seen in FIG. 8, an energy source 70, which may be, for example, a battery or a fuel tank of a fuel cell, may be readily replaced in an electronic shelf label 72 without requiring detachment of the electronic shelf label 72 from its mounting location. The energy source 70 may be snap fit mountable in the electronic shelf label 72 or be removably and replaceably mounted therein in any other suitable manner.

Figure 9:
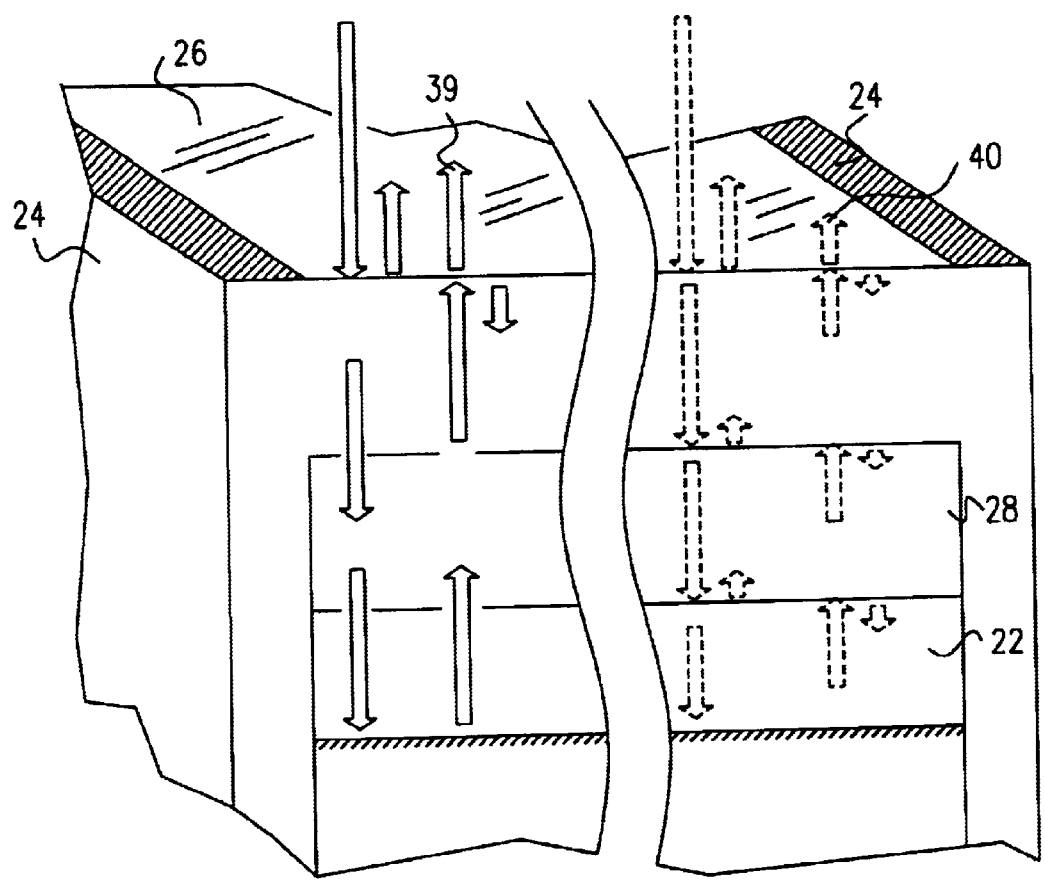
FIG. 9 is a simplified diagrammatic illustration, taken along the line IX—IX in FIG. 8, which is useful in understanding the advantages of the structure of the embodiment of FIG. 8.

Reference is now made to FIG. 9, which is a simplified diagrammatic illustration, taken along the line IX—IX in FIG. 6, and which is useful in understanding the advantages of the structure of the embodiment of FIG. 6. As seen in FIG. 9, the presence of the at least partially transparent intermediate layer 28 having an index of refraction which is selected so as to minimize reflection at interfaces between the at least partially transparent intermediate layer 28 and both LCD display 22 and the protective at least partially transparent cover layer 26 produces an enhanced display output intensity, indicated by solid arrow 39 as compared with an embodiment without layer 28 or having a layer 28 with a substantially non-optimal index of refraction, whose display output intensity is indicated by a dashed arrow 40. The difference in amplitude and intensity between outputs 39 and 40 is accounted for by additional reflections at the boundary between the housing 24 and the intermediate layer 28 and between the LCD display 22 and the intermediate layer 28, as illustrated in FIG. 9.

It is appreciated that layer 28 preferably is selected to have an index of refraction which is identical to one or both of layers 22 and 26. Another preferred solution is that the index of refraction of layer 28 vary from an index of refraction identical to that of layer 22, adjacent layer 22 to an index of refraction identical to that of layer 26, adjacent layer 26. Alternatively the index of refraction of layer 28 may not be optimal but may nevertheless provide a result which is enhanced as compared with the absence of layer 28.

Figure 10:
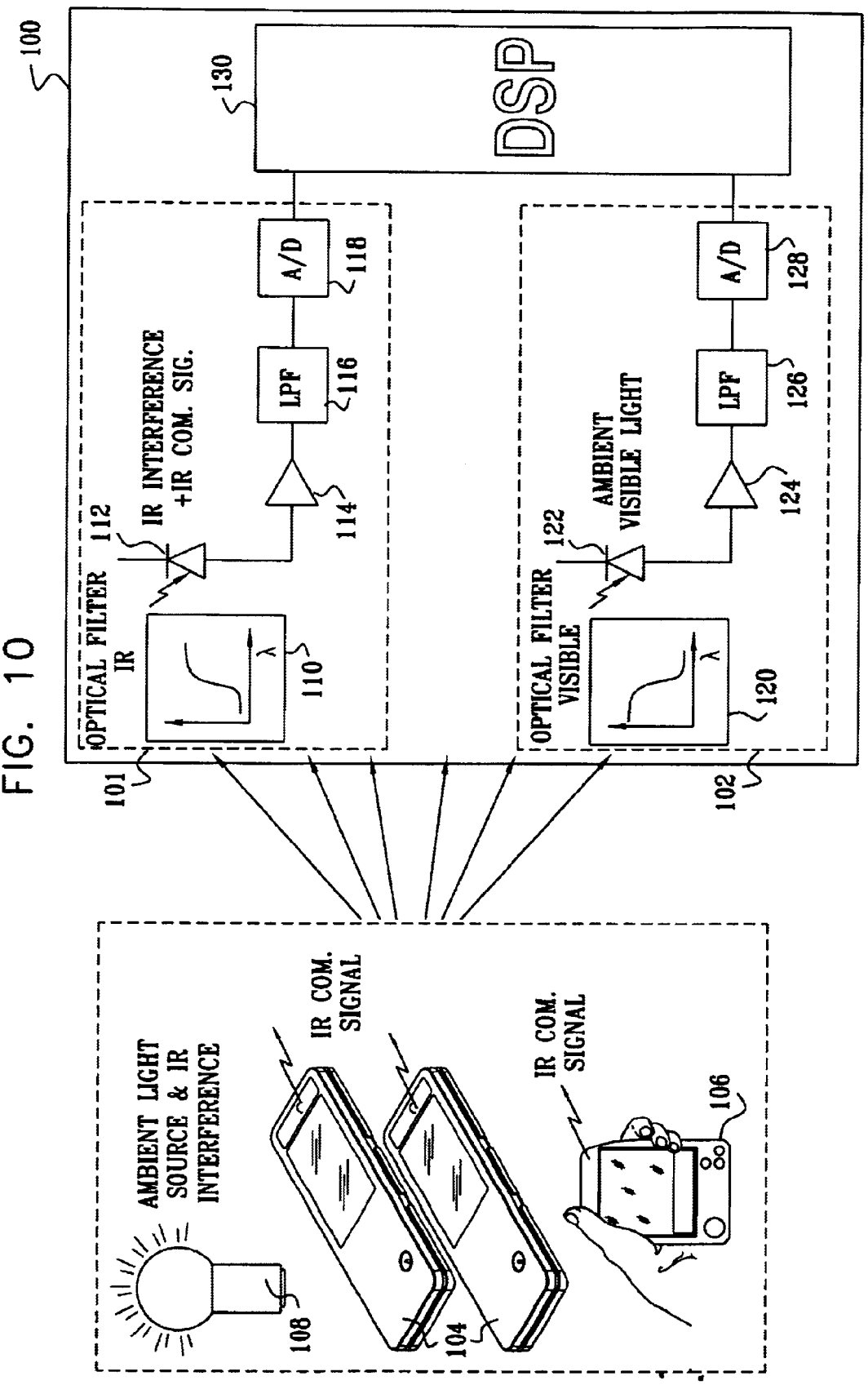
FIG. 10 is a simplified diagrammatic illustration of a receiver useful in the system of FIG. 1.

Reference is now made to FIG. 10, which is a simplified diagrammatic illustration of a preferred embodiment of a receiver 100 useful in the present invention, such as optical sensor 18 (FIG. 1) located within the transceiver 12 in the system of FIG. 1. As seen in FIG. 10, the receiver 100 preferably includes two processing channels, here designated by reference numerals 101 and 102. Both of the channels 101 and 102 receive radiation including both IR communication signals from electronic shelf labels 104 and possibly other IR communicators 106 as well as ambient radiation such as that from incandescent and fluorescent lamps 108. This ambient radiation includes both visible radiation and IR interference, which must be somehow separated from the IR communication signals.

Channel 101 includes an optical filter 110 which generally passes only radiation in the IR band, typically from 850–950 nm. The output of optical filter 110 is sensed by a photodiode 112, whose output is amplified by an amplifier 114 and passed through a low pass frequency filter 116 and supplied to an A/D converter 118.

Channel 102 includes a optical filter 120 which generally passes only radiation in the visible band, typically from 350–750 nm. The output of optical filter 120 is sensed by a photodiode 122, whose output is amplified by an amplifier 124 and passed through a low pass frequency filter 126 and supplied to an A/D converter 128.

The outputs of A/D converters 118 and 128 are preferably supplied to a digital signal processor (DSP) 130 or to any other suitable CPU. Preferred functionality of the DSP 130 to cancel the noise in the output of A/D converter 118 based on the output of A/D converter 128. This functionality is based on an appreciation that the electromagnetic interference in the visible band has certain similarities to that in the IR band.

Figure 11:
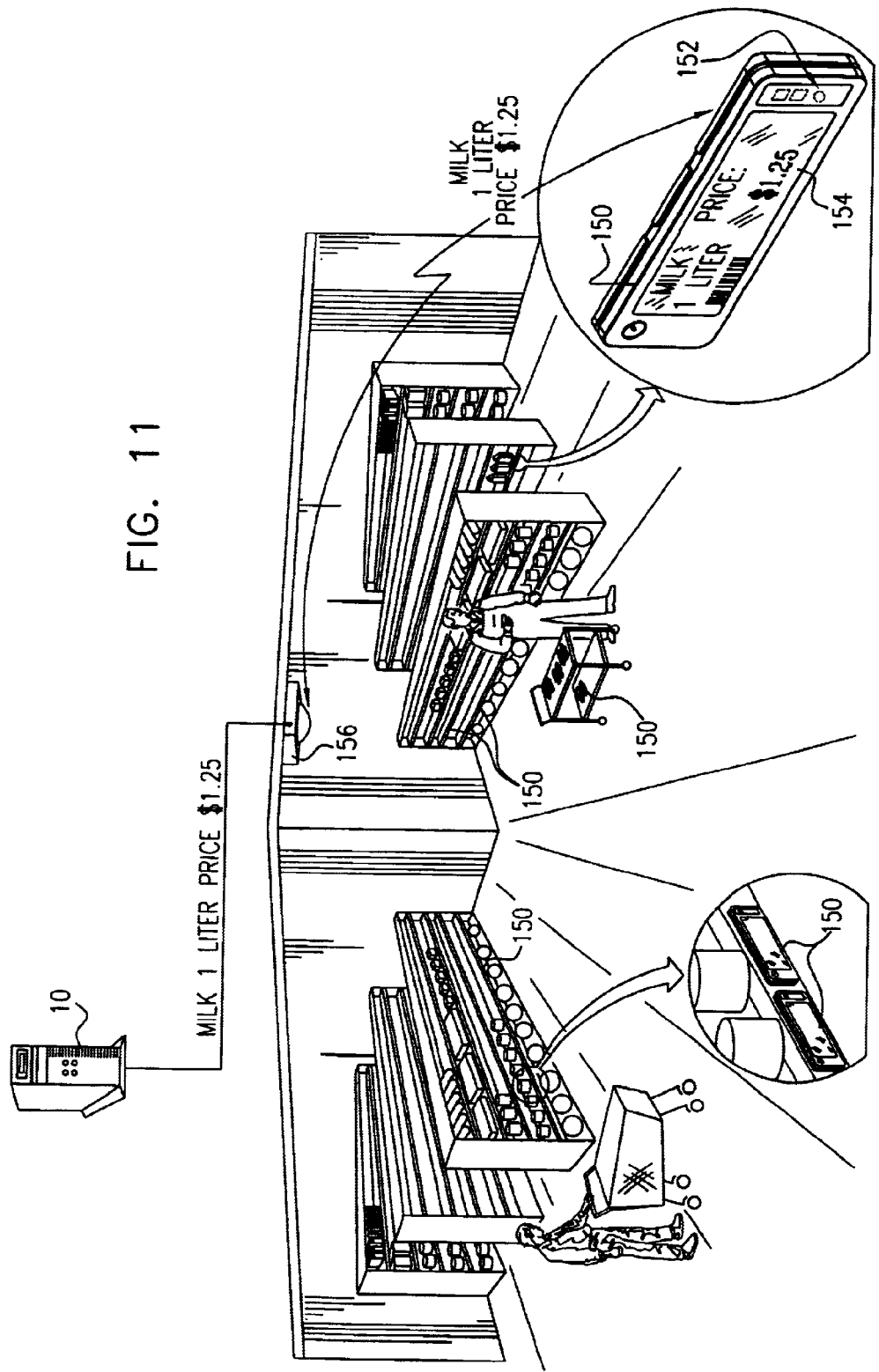
FIG. 11 is a simplified pictorial view illustration of an electronic shelf label system constructed and operative in accordance with another preferred embodiment of the present invention.

Reference is now made to FIG. 11, which is a simplified pictorial view illustration of an electronic shelf label system constructed and operative in accordance with another preferred embodiment of the present invention. As seen in FIG. 11, there is provided an electronic shelf label system comprising a multiplicity of electronic shelf labels 150 each including inter alia an IR receiver 152 for receiving information relating to the electronic shelf label 150 and an electronic display 154 for displaying price and product information based on the information received by the IR receiver 152. The electronic display 154 is preferably a unitary LCD display.

The system also includes at least one transmitter 156, providing IR transmissions containing information to the multiplicity of electronic shelf labels 150. It is a particular feature of the present invention that the transmitter 156 transmits not only price information to labels 150. Preferably transmitter 156 transmits both price and product description information, which is preferably displayed concurrently on electronic display 154.

In accordance with an embodiment of the present invention, other information transmitted by transmitter 156 may also be displayed in additional display modes. This information may include, for example, stock information, shelf width information and other information which is normally not displayed to customers but may be displayed to aisle managers at suitable times or upon appropriate actuation by authorized personnel.

Figure 12:
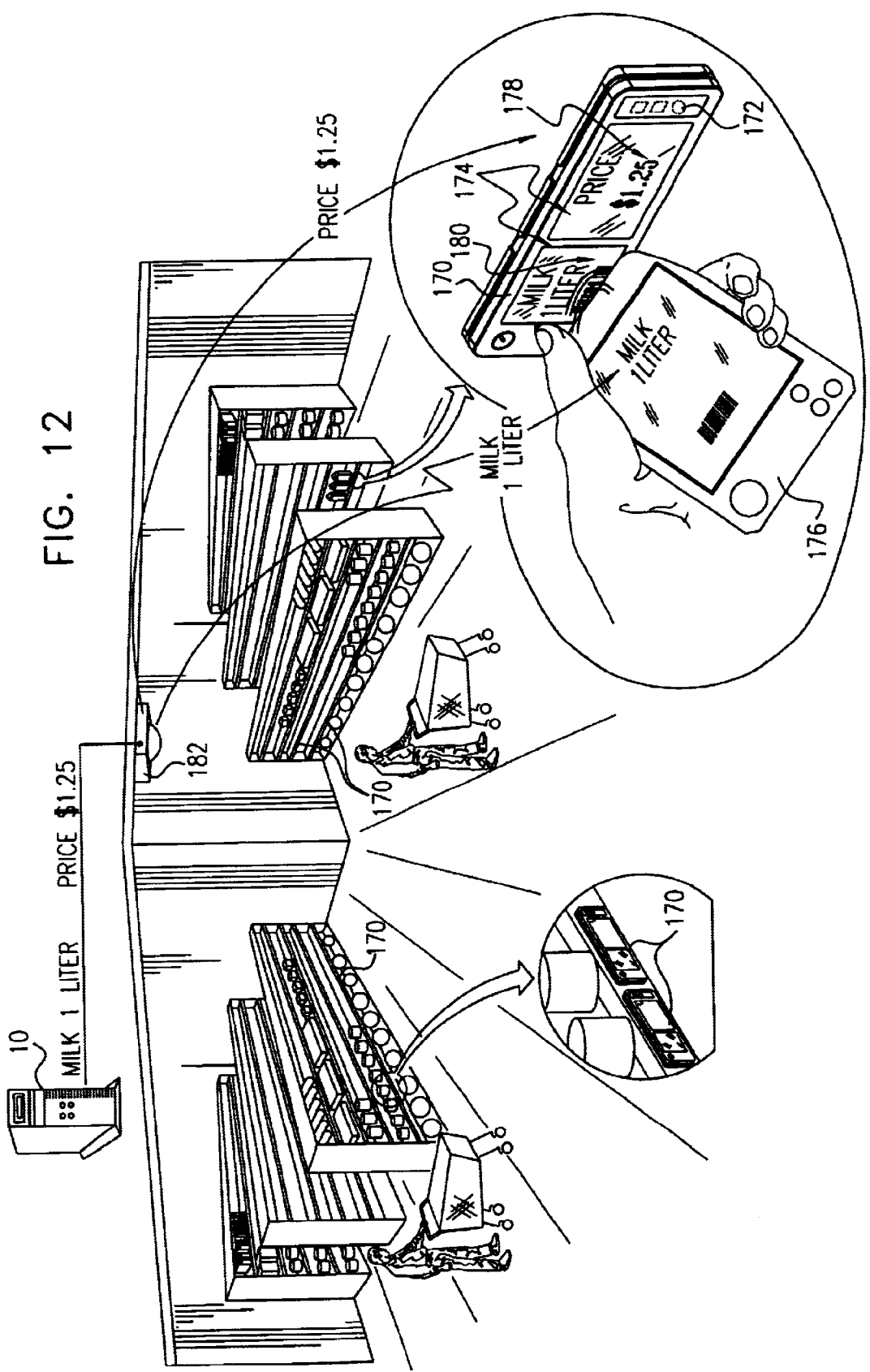
FIG. 12 is a simplified pictorial view illustration of an electronic shelf label system constructed and operative in accordance with still another preferred embodiment of the present invention.

Reference is now made to FIG. 12, which is a simplified pictorial view illustration of an electronic shelf label system constructed and operative in accordance with still another preferred embodiment of the present invention. The system of FIG. 12 may be similar to that of FIG. 11, and preferably includes a multiplicity of electronic shelf labels 170 each including inter alia an IR receiver 172 for receiving information relating to the electronic shelf label 170 and an electronic display 174 for displaying price and product information. In the system of FIG. 12, at least part of the information displayed on electronic display 174 is supplied to the electronic shelf label 170 by a hand held unit 176.

The electronic display 174 is preferably a two-part LCD display including a first part 178 which displays information received by the IR receiver 172 and a second part 180 which displays information which is written therein by hand-held unit 176. Hand held unit 176 is preferably operative to directly write information onto second part 180 of electronic display 174. An example of a suitable hand-held unit 176 useful for this purpose is a model PT2000 Portable Terminal, commercially available from PSC INc. of Webster, N.Y., U.S.A., which is typically attached to a LCD writing device (not shown). The LCD writing device communicates with the hand-held unit 176 for replacing "old" product data from the LCD 180 with "new" product data. An example of a display 180 which is suitable for use with unit 176 is a bistable LCD. The hand-held unit 176 is typically operative when in propinquity or even in contact with the second part 180 of display 174. Alternatively direct writing of information onto second part 180 of electronic display 174 need not be carried out by a hand-held unit and need not take place at the shelf.

The system also includes at least one transmitter 182, transmitting IR transmissions containing the price information to the multiplicity of electronic shelf labels 170. It is a particular feature of the present invention that the hand held unit 176 and/or the transmitter 182 may transmit not only price information to labels 170.

Preferably both price and product description information is displayed concurrently on electronic display 174. In accordance with an embodiment of the present invention, other information may also be displayed in additional display modes. This information may include, for example, stock information, shelf width information and other information which is normally not displayed to customers but may be displayed for aisle managers at suitable times or upon appropriate actuation by authorized personnel.

Figure 13:
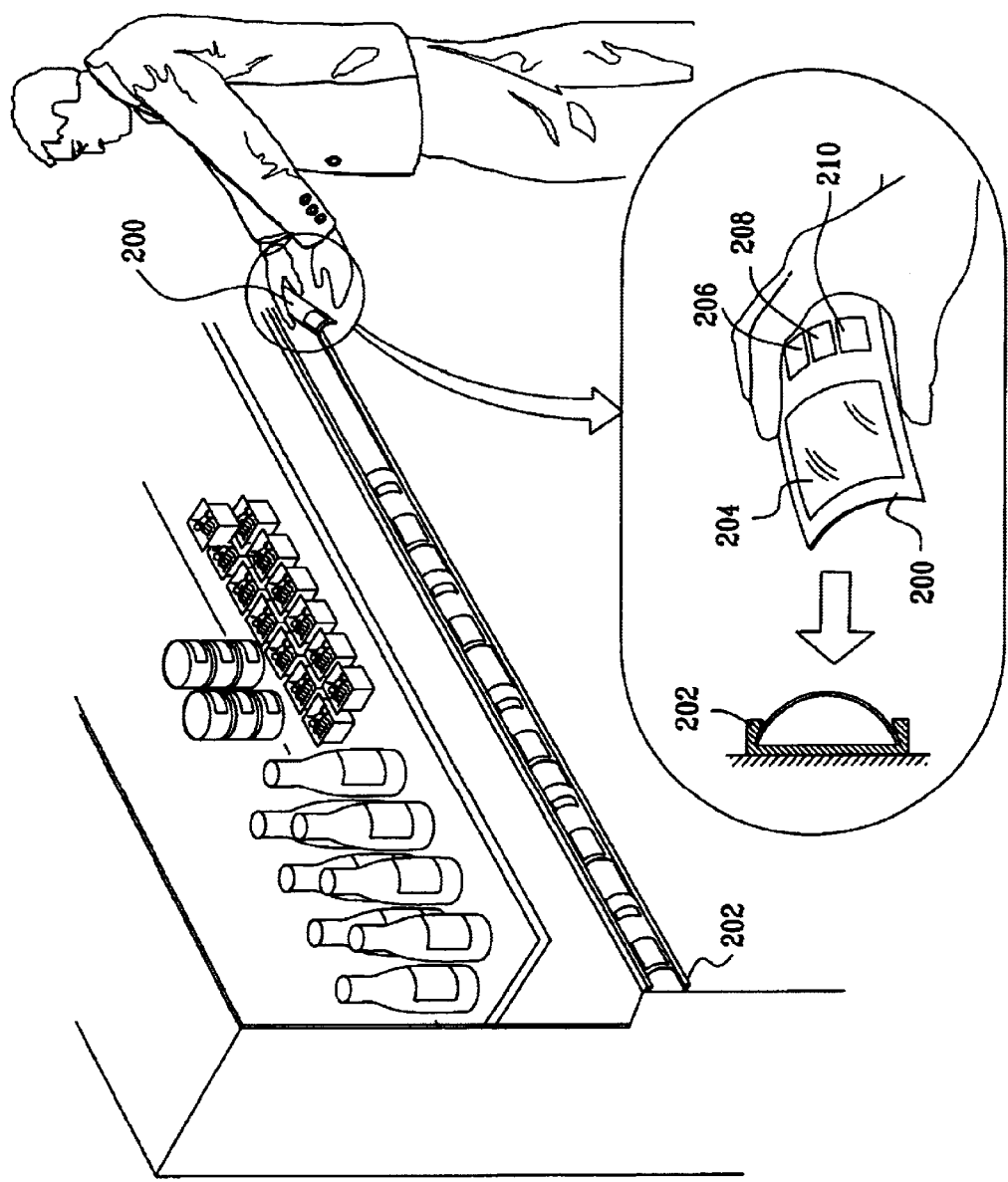
FIG. 13 is a simplified pictorial view illustration of an electronic shelf label constructed and operative with a further preferred embodiment of the present invention.

Reference is now made to FIG. 13, which is a simplified pictorial view illustration of an electronic shelf label constructed and operative with a further preferred embodiment of the present invention. As seen in FIG. 13, there is provided in accordance with a preferred embodiment of the present invention a flexible electronic shelf label 200, which is particularly useful and provides ease of mounting in conventional shelf edge mounts 202. The flexible electronic shelf label 200 preferably comprises a flexible plastic liquid crystal display 204 or other flexible electronic display, onto which are preferably mounted a transceiver 206, a power supply 208, such as a thin paper like battery commercially available from Power Paper Ltd. of Kibbutz Einat, Israel, or a fuel cell, and electronic control circuitry 210. The electronic shelf label 200 may operate in any suitable manner known in the art, inter alia in a manner shown and described hereinabove.

Figure 14:
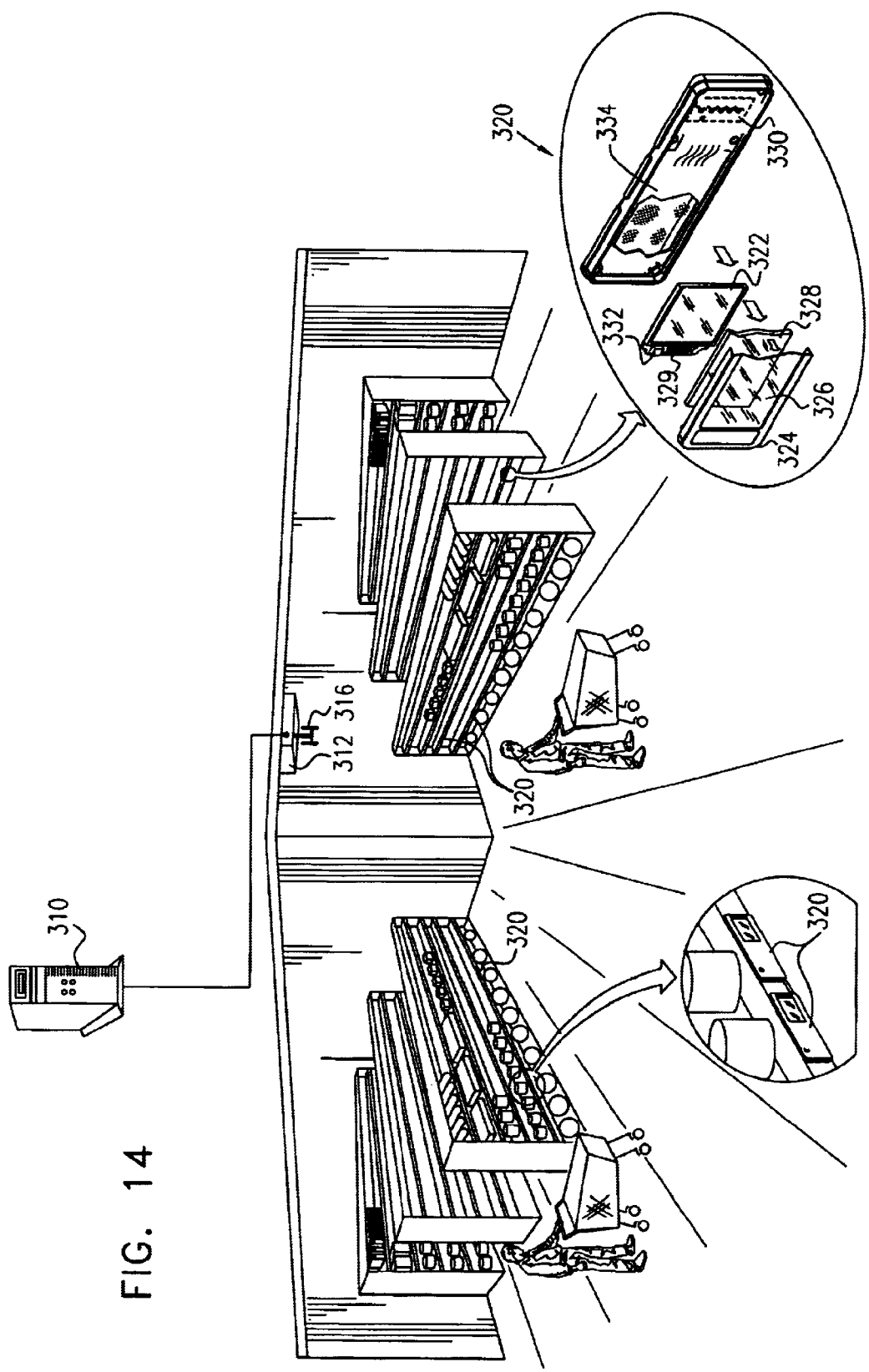
FIG. 14 is a simplified pictorial view illustration of an electronic shelf label system constructed and operative in accordance with yet another preferred embodiment of the present invention which uses an RF data link.

Reference is now made to FIG. 14 which is a simplified pictorial view Illustration of an electronic shelf label system constructed and operative in accordance with yet another preferred embodiment of the present invention which uses an RF data link.

The system of FIG. 14 typically includes one or more servers 310 which may be located on the premises of a shop, such as a supermarket or alternatively may be located remotely therefrom and connected thereto by means of any suitable communication subsystem.

Located within the premises of the shop are one or more RF transceiver assemblies 312. Information transmittal and receipt is carried out using RF communication methodology.

In accordance with a preferred embodiment of the present invention, transceiver assembly 312 includes at least one RF antenna 316.

A multiplicity of electronic shelf labels 320 are disposed throughout the shop, typically on shelf edges. In accordance with a preferred embodiment of the present invention, the electronic shelf labels 320 are each in wireless communication with one or more transceiver assemblies 312 for receiving and confirming information updates for display by the electronic shelf labels 320.

In accordance with a preferred embodiment of the present invention, each electronic shelf label 320 includes the LCD display 322 disposed in the housing 324 including the protective, at least partially transparent, cover layer 326 disposed over the LCD display 322 and in spaced relationship thereto. An at least partially transparent intermediate layer 28 is preferably formed over the LCD display 322 and substantially fills the space between the LCD display 322 and the protective at least partially transparent cover layer 326.

The electronic shelf label 320 also comprises an RF antenna 329 for data transmission and receiving from and to the electronic shelf label 320 to the antenna 316 which is located on the transceiver 312.

Preferably, the at least partially transparent intermediate layer 328 has an index of refraction which is selected so as to minimize reflection at interfaces between the at least partially transparent intermediate layer 328 and both LCD display 322 and the protective at least partially transparent cover layer 326.

In accordance with a preferred embodiment of the invention, the at least partially transparent intermediate layer 328 is located with respect to LCD display 322 and to the protective at least partially transparent cover layer 326 so as to substantially eliminate air gaps therebetween.

As seen in FIG. 14, the electronic shelf label 320 preferably, includes at least one fuel cell 330 powering the LCD display 322 and preferably other elements of the electronic shelf label 320. The fuel cell 320 and its respective members are described hereinabove with respect to FIGS. 2 and 3.

Additionally, as seen in FIG. 14, the electronic shelf label 320 preferably includes at least one electrically powered illuminator, which is powered by the fuel cell 330. The illuminator may be a flashing LED 332. Alternatively or additionally, the illuminator may include a backlight (not shown) for LCD display 322. The backlight may include an electroluminescent element, an LED or any other suitable illumination element. It is also appreciated that the LCD display 322 may be replaced by any other suitable type of electrically powered display.

The fuel cell 330 preferably has an average mean power output of less than approximately 50 microwatts and an average peak power output of less than approximately 3 milliwatt. The fuel cell 330 is in fluid communication with a fuel tank 334. Fuel tank 334 preferably is fluid refuelable without requiring dismounting of the housing 334 from its mounting location. In accordance with one embodiment of the present invention, the at least one fuel cell is replaceable without requiring dismounting of the housing from its mounting location.

Preferably, the fuel tank 334 has sufficient energy storage capacity such that the electrically powered illuminator and the electrically driven display have an average lifetime without requiring repowering of at least six months.

It is appreciated that the embodiments described hereinabove with respect to FIGS. 4 to 8 and 10 to 13, may also use an RF data link.

It will be appreciated by persons skilled in the art that the present invention is not limited by what has been particularly shown and described hereinabove. Rather the scope of the present invention includes both combinations and subcombinations of the various features described hereinabove as well as variations and modifications which would occur to persons skilled in the art upon reading the specification and which are not in the prior art.

I claim:

1. An electronic shelf label comprising:
   an LCD display;
   a housing including a protective at least partially transparent cover layer disposed over said LCD display and in spaced relationship thereto;
   an at least partially transparent intermediate layer formed over said LCD display and substantially filling a space between said LCD display and said protective at least partially transparent cover layer; and
   at least one receiver receiving IR transmissions including:
      an IR sensor;
      a non-IR visible light sensor; and
      circuitry for employing an output of the non-IR visible light sensor for reducing interference in a signal band sensed by said IR sensor.

2. An electronic shelf label according to claim 1 and wherein said at least partially transparent intermediate layer has an index of refraction which is selected so as to minimize reflection at interfaces between said at least partially transparent intermediate layer and both of said LCD display and said protective at least partially transparent cover layer.

3. An electronic shelf label according to claim 2 and wherein said index of refraction is identical to the index of refraction of at least one of said LCD display and said protective at least partially transparent cover layer.

4. An electronic shelf label according to claim 2 and wherein said index of refraction varies from one surface of said intermediate layer to an opposite surface thereof.

5. An electronic shelf label according to claim 1 and wherein said at least partially transparent intermediate layer is located with respect to said LCD display and to said protective at least partially transparent cover layer so as to substantially eliminate air gaps therebetween.

6. An electronic shelf label according to claim 2 and wherein said at least partially transparent intermediate layer is located with respect to said LCD display and to said protective at least partially transparent cover layer so as to substantially eliminate air gaps therebetween.

7. An electronic shelf label according to claim 1 and also comprising at least one fuel cell powering said LCD display.

8. An electronic shelf label according to claim 7 and also comprising a data communicator providing display data to said LCD display from an external data source and wherein said fuel cell powering said LCD display includes a fuel tank, filling generally the volume of said housing not occupied by said display and said data communicator.

9. An electronic shelf label system comprising:
   a multiplicity of electronic shelf labels, each including an IR transmitter for transmitting information relating to the electronic shelf label; and
   at least one receiver receiving IR transmissions from said multiplicity of electronic shelf labels, said at least one receiver including:
      an IR sensor;
      a non-IR visible light sensor; and
      circuitry for employing an output of the non-IR visible light sensor for reducing interference in a signal band sensed by said IR sensor.

10. An electronic shelf label system according to claim 9 and wherein each of said multiplicity of electronic shelf labels comprises:
   an LCD display;
   a housing including a protective at least partially transparent cover layer disposed over said LCD display and in spaced relationship thereto; and
   an at least partially transparent intermediate layer formed over said LCD display and substantially filling a space between said LCD display and said protective at least partially transparent cover layer.

11. An electronic shelf label system according to claim 10 and wherein said at least partially transparent intermediate layer has an index of refraction which is selected so as to minimize reflection at interfaces between said at least partially transparent intermediate layer and both of said LCD display and said protective at least partially transparent cover layer.

12. An electronic shelf label system according to claim 11 and wherein said at least partially transparent intermediate layer is located with respect to said LCD display and to said protective at least partially transparent cover layer so as to substantially eliminate air gaps therebetween.

13. An electronic shelf label system according to claim 10 and wherein said at least partially transparent intermediate layer is located with respect to said LCD display and to said protective at least partially transparent cover layer so as to substantially eliminate air gaps therebetween.

14. An electronic shelf label system according to claim 10 and wherein each electronic shelf label also comprises at least one fuel cell powering said LCD display.

15. An electronic shelf label system according to claim 14 and wherein each of said multiplicity of electronic shelf labels also includes a data communicator providing display data to said LCD display from an external data source and wherein said fuel cell powering said LCD display includes a fuel tank, filling generally the volume of said housing not occupied by said display and said data communicator.

16. An electronic shelf label system according to claim 9 and wherein each electronic shelf label also comprises:
    an LCD display; and
    at least one fuel cell powering said LCD display.

17. An electronic shelf label system according to claim 16 and wherein each of said multiplicity of electronic shelf labels also includes a data communicator providing display data to said LCD display from an external data source and wherein said fuel cell powering said LCD display includes a fuel tank, filling generally the volume of said housing not occupied by said display and said data communicator.

18. An electronic shelf label comprising:
    a housing;
    an electrically driven display mounted in said housing;
    at least one electrically powered illuminator;
    at least one fuel cell powering said electrically driven display and said at least one electrically powered illuminator;
    a data communicator providing display data to said electrically driven display from an external data source, and
    at least one receiver receiving IR transmissions including:
        an IR sensor;
        a non-IR visible light sensor; and
        circuitry for employing an output of the non-IR visible light sensor for reducing interference in a signal band sensed by said IR sensor.

19. An electronic shelf label according to claim 18 and wherein said at least one electrically powered illuminator and said electrically driven display have an average lifetime without requiring repowering of at least six months.

20. An electronic shelf label according to claim 18 and wherein said at least one fuel cell has an average mean power output of less than approximately 50 microwatts.

21. An electronic shelf label according to claim 18 and wherein said at least one fuel cell has an average peak power output of less than approximately 3 milliwatt.

22. An electronic shelf label according to claim 18 and wherein said at least one fuel cell includes a fuel tank, said fuel tank being fluid refuelable without requiring dismounting of said housing from a mounting location.

23. An electronic shelf label according to claim 18 and wherein at least a fuel storage element of said at least one fuel cell is replaceable without requiring dismounting of said housing from a mounting location.

24. An electronic shelf label according to claim 18 and also comprising an at least partially transparent intermediate layer formed over said display and substantially filling a space between said display and said housing.

25. An electronic shelf label according to claim 24 and wherein said at least partially transparent intermediate layer has an index of refraction which is selected so as to minimize reflection at interfaces between said at least partially transparent intermediate layer and both of said display and said housing.

26. An electronic shelf label according to claim 25 and wherein said index of refraction is identical to the index of refraction of at least one of said display and said housing.

27. An electronic shelf label according to claim 24 and wherein said at least partially transparent intermediate layer is located with respect to said display and said housing so as to substantially eliminate air gaps therebetween.

28. An electronic shelf label comprising:
    a housing;
    an electrically driven display mounted in said housing;
    a data communicator providing display data to said electrically driven display from an external data source;
    at least one fuel cell powering said electrically driven display, said at least one fuel cell including a fuel tank, filling generally the volume of said housing not occupied by said display and said data communicator; and
    at least one receiver receiving IR transmissions including:
        an IR sensor;
        a non-IR visible light sensor; and
        circuitry for employing an output of the non-IR visible light sensor for reducing interference in a signal band sensed by said IR sensor.

29. An electronic shelf label according to claim 28 and also comprising at least one electrically powered illuminator,
    and wherein said at least one electrically powered illuminator and said electrically driven display have an average lifetime without requiring repowering of at least six months.

30. An electronic shelf label according to claim 28 and wherein said at least one fuel cell has an average mean power output of less than approximately 50 microwatts.

31. An electronic shelf label according to claim 28 and wherein said at least one fuel cell has an average peak power output of less than approximately 3 milliwatt.

32. An electronic shelf label according to claim 28 and wherein said fuel tank is fluid refuelable without requiring dismounting of said housing from a mounting location.

33. An electronic shelf label according to claim 28 and wherein at least a fuel storage element of said at least one fuel cell is replaceable without requiring dismounting of said housing from a mounting location.

34. An electronic shelf label comprising:
    a housing;
    an electrically driven display mounted in said housing;
    at least one electrically powered illuminator;
    at least one replaceable energy source powering said electrically driven display and said at least one electrically powered illuminator;
    a data communicator providing display data to said electrically driven display from an external data source, said at least one replaceable energy source being replaceable without requiring dismounting of said housing from a mounting location; and at least one receiver receiving IR transmissions including:
an IR sensor;
a non-IR visible light sensor; and
circuitry for employing an output of the non-IR visible light sensor for reducing interference in a signal band sensed by said IR sensor.

35. An electronic shelf label according to claim 34 and also comprising an at least partially transparent intermediate layer formed over said display and substantially filling a space between said display and said housing.

36. An electronic shelf label according to claim 35 and wherein said at least partially transparent intermediate layer has an index of refraction which is selected so as to minimize reflection at interfaces between said at least partially transparent intermediate layer and both of said display and said housing.

37. An electronic shelf label according to claim 35 and wherein said at least partially transparent intermediate layer is located with respect to said display and said housing so as to substantially eliminate air gaps therebetween.

38. An electronic shelf label comprising:
a flexible electrically driven display;
at least one flexible power supply powering said electrically driven display;
a data communicator providing display data to said electrically driven display from an external data source; and
at least one receiver receiving IR transmissions including:
an IR sensor;
a non-IR visible light sensor; and
circuitry for employing an output of the non-IR visible light sensor for reducing interference in a signal band sensed by said IR sensor.

39. An electronic shelf label system comprising:
a multiplicity of flexible electronic shelf labels, each including an IR transmitter for transmitting information relating to the electronic shelf label; and
at least one receiver receiving IR transmissions from said multiplicity of flexible electronic shelf labels, said at least one receiver including:
an IR sensor;
a non-TR visible light sensor; and
circuitry for employing an output of the non-IR visible light sensor for reducing interference in a signal band sensed by said IR sensor.

40. An electronic shelf label system according to claim 39 and wherein each of said multiplicity of electronic shelf labels comprises a flexible LCD display.

41. An electronic shelf label system according to claim 40 and wherein each electronic shelf label also comprises at least one fuel cell powering said LCD display.

42. An electronic shelf label system according to claim 41 and wherein said fuel cell powering said LCD display includes a fuel tank.

43. An electronic shelf label system according to claim 42 and wherein each of said multiplicity of electronic shelf labels includes a housing wherein said fuel tank is fluid refuelable without requiring dismounting of said housing from a mounting location.

44. An electronic shelf label system according to claim 41 and wherein said at least one fuel cell has an average peak power output of less than approximately 3 milliwatt.

45. An electronic shelf label system comprising:
a multiplicity of electronic shelf labels, each including:
an IR transmitter for transmitting information relating to the electronic shelf label; and
an electronic display for displaying product information;
at least one receiver receiving IR transmissions from said multiplicity of electronic shelf labels, said at least one receiver including:
an IR sensor;
a non-IR visible light sensor; and
circuitry for employing an output of the non-IR visible light sensor for reducing interference in a signal band sensed by said IR sensor; and
a product information entry device which is operative to directly write product information to said electronic display when in propinquity thereto.

46. An electronic shelf label system comprising:
a multiplicity of electronic shelf labels, each including:
a first IR transmitter for transmitting information relating to the electronic shelf label;
a first IR receiver for receiving information relating to the electronic shelf label; and
an electronic display for displaying product information based on said information received by said first IR receiver;
at least one second receiver receiving IR transmissions from said multiplicity of electronic shelf labels, said at least one second receiver including:
an IR sensor;
a non-IR visible light sensor; and
circuitry for employing an output of the non-IR visible light sensor for reducing interference in a signal band sensed by said IR sensor; and
at least one second transmitter transmitting IR transmissions containing said information to said multiplicity of electronic shelf labels,
said at least one second transmitter being characterized in that it transmits information including both price and product description.

47. An electronic shelf label system according to claim 46 and wherein said electronic display displays both said price and said product description.

48. An electronic shelf label system according to claim 47 and wherein said first receiver receives said information including both price and product description.

49. An electronic shelf label system according to claim 47 and wherein said electronic display comprises a unitary LCD display.

50. An electronic shelf label system according to claim 49 and also comprising a portable product information entry device which is operative to supply product information to said electronic display when in propinquity thereto.

51. An electronic shelf label system according to claim 50 and wherein said portable product information entry device is operative to receive a transmission from said second transmitter including said product information and to provide said product information to said electronic display when in propinquity thereto.

52. An electronic shelf label system according to claim 50 and wherein said portable product information entry device is operative to directly write product information onto said electronic display.

53. An electronic shelf label system according to claim 47 and wherein said first receiver receives said price information and wherein said product information is supplied to said electronic display other than via said first receiver.

54. An electronic shelf label system according to claim 47 and wherein said electronic display comprises at least two separate LCD displays, at least one of which is operative to display price information received via said first receiver and at least one of which is operative to display product information received other than via said first receiver.

55. An electronic shelf label system according to claim 46 and wherein said electronic shelf labels are flexible.

56. An electronic shelf label system comprising:
a multiplicity of electronic shelf labels, each including:
an IR transmitter for transmitting information relating to the electronic shelf label;
an RF receiver for receiving information relating to the electronic shelf label; and
an electronic display for displaying product information based on said information received by said RF receiver;
at least one IR receiver receiving IR transmissions from said multiplicity of electronic shelf labels, said at least one IR receiver including:
an IR sensor;
a non-IR visible light sensor; and
circuitry for employing an output of the non-IR visible light sensor for reducing interference in a signal band sensed by said IR sensor; and
at least one RF transmitter transmitting RF transmissions containing said information to said multiplicity of electronic shelf labels,
said at least one RF transmitter being characterized in that it transmits information including both price and product description.

57. An electronic shelf label system according to claim 56 and wherein said electronic display displays both said price and said product description.

58. An electronic shelf label system according to claim 57 and wherein said RF receiver receives said information including both price and product description.

59. An electronic shelf label system according to claim 57 and wherein said electronic display comprises a unitary LCD display.

60. An electronic shelf label system according to claim 59 and also comprising a portable product information entry device which is operative to supply product information to said electronic display when in propinquity thereto.

61. An electronic shelf label system according to claim 60 and wherein said portable product information entry device is operative to receive a transmission from said RF transmitter including said product information and to provide said product information to said electronic display when in propinquity thereto.

62. An electronic shelf label system according to claim 60 and wherein said portable product information entry device is operative to directly write product information onto said electronic display.

63. An electronic shelf label system according to claim 57 and wherein said RF receiver receives said price information and wherein said product information is supplied to said electronic display other than via said RF receiver.

64. An electronic shelf label system according to claim 57 and wherein said electronic display comprises at least two separate LCD displays, at least one of which is operative to display price information received via said RF receiver and at least one of which is operative to display product information received other than via said RF receiver.

65. An electronic shelf label system according to claim 56 and wherein said electronic shelf labels are flexible.

* * * * *